(12) United States Patent
Ukil

(10) Patent No.: US 9,836,622 B2
(45) Date of Patent: Dec. 5, 2017

(54) PRIVACY UTILITY TRADE OFF TOOL

(71) Applicant: TATA CONSULTANCY SERVICES LIMITED, Mumbai (IN)

(72) Inventor: Arijit Ukil, Kolkata (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 0 days.

(21) Appl. No.: 14/430,866

(22) PCT Filed: Aug. 27, 2013

(86) PCT No.: PCT/IN2013/000518
§ 371 (c)(1),
(2) Date: Mar. 24, 2015

(87) PCT Pub. No.: WO2014/049605
PCT Pub. Date: Apr. 3, 2014

(65) Prior Publication Data
US 2015/0269391 A1  Sep. 24, 2015

(30) Foreign Application Priority Data
Sep. 27, 2012 (IN) .......................... 2851/MUM/2012

(51) Int. Cl.
*G06F 21/62* (2013.01)
(52) U.S. Cl.
CPC ................................ *G06F 21/6254* (2013.01)
(58) Field of Classification Search
CPC .................................................. G06F 21/6254
See application file for complete search history.

(56) References Cited

U.S. PATENT DOCUMENTS 4,977,596 A * 12/1990 Maestas ................... H04L 9/12
370/503
6,466,516 B1 * 10/2002 O'Brien, Jr. ............ G06F 17/18
367/131
(Continued)

OTHER PUBLICATIONS

Of Liu et al. "The applicability of the perturbation based privacy preserving data mining for real-world data", http://www.utdallas.edu/~muratk/publications/liu-privacy.pdf, dated Jul. 18, 2007.) hereinafter referred to as Liu.*
(Continued)

*Primary Examiner* — Oleg Korsak
*Assistant Examiner* — Simon Kanaan
(74) *Attorney, Agent, or Firm* — Seed IP Law Group LLP

(57) ABSTRACT

Method(s) and system(s) for providing an optimal trade off point between privacy of a private data and utility of a utility application thereof are described. The method includes quantifying privacy content of a private data associated with a user based on uniqueness of information in the private data, where the private content comprises sensitive information about the user. The method further includes determining a privacy-utility trade off point model based on analytical analysis of the privacy content, a privacy requirement of the user, and a utility requirement of third party to which the private data is disclosed, where the privacy-utility trade off point model is indicative of optimal private data sharing technique with the third party. Furthermore, the method also includes identifying privacy settings for the user based on risk appetite of the third party, utilizing the determined privacy-utility tradeoff point model.

3 Claims, 2 Drawing Sheets

(56) References Cited

U.S. PATENT DOCUMENTS

| | | | | |
|---|---|---|---|---|
| 9,373,078 B1* | 6/2016 | Olsson | ...................... | G06N 5/02 |
| 2003/0076245 A1* | 4/2003 | Gibson | ................. | H04L 1/0006 |
| | | | | 341/50 |
| 2005/0157780 A1* | 7/2005 | Werner | ................. | H04L 25/028 |
| | | | | 375/232 |
| 2007/0071238 A1* | 3/2007 | Adams | .................. | H04L 9/3247 |
| | | | | 380/46 |
| 2009/0165086 A1* | 6/2009 | Trichina | .................. | G06F 7/588 |
| | | | | 726/2 |
| 2010/0153787 A1* | 6/2010 | Beattie, Jr. | .......... | H04L 41/0681 |
| | | | | 714/43 |
| 2012/0290950 A1* | 11/2012 | Rapaport | ................ | H04L 51/32 |
| | | | | 715/753 |
| 2014/0058801 A1* | 2/2014 | Deodhar | ............ | G06Q 10/0639 |
| | | | | 705/7.38 |
| 2015/0254782 A1* | 9/2015 | Riggs-Miller | ......... | G06Q 40/06 |
| | | | | 705/30 |

OTHER PUBLICATIONS

International Search Report and Written Opinion dated Feb. 24, 2014 for corresponding International Application No. PCT/IN2013/000518, 7 pages.

Massaguer et al., "Middleware for Pervasive Spaces: Balancing Privacy and Utility," *Middleware 2009,* 10th International Middleware Conference, Urbana, IL, USA, Nov. 30-Dec. 4, 2009, 20 pages.

* cited by examiner

PRIVACY UTILITY TRADE OFF TOOL

TECHNICAL FIELD

The subject matter described herein, in general, relates to privacy and utility of data and in particular, relates to privacy and utility tradeoff for processing of the data.

BACKGROUND

With the increased use of Internet for e-commerce, data subscriptions, internet downloads, healthcare applications, financial analysis, etc, a large amount of data is collected, assimilated, processed and analyzed. Several of the applications depend largely on processing of such data including personal information for effective functioning. For example, applications in financial domain may utilize information about a person including his personal information, such as his salary, savings, credit pattern and spending pattern. Similarly, a hospital application may collect information with regard to a person's insurance details, health records, diagnosis results, current and past medication, etc. Further an e-commerce application may request information about a person's personal preferences which could include their preferred mode of entertainment, appliances that are most used, preferred brands etc.

Therefore, the data utilized by multiple applications, along with other data relevant to the application, includes personal information, personal preferences, etc. Such personal information is generally referred to as "private data" and is the data that is private to the data owners.

The private data of users when utilized in different applications also possesses good amount of utility. Such as, private data can be used for marketing purposes, for studies, including, financial analysis or health care research. The private data taken is generally analyzed, assimilated and, utilized by different applications. Since the private data that is assimilated includes personal details to users, use of such can directly expose a person's identity. Exposed identity may affect individuals in different ways, such as; the private data revealed may add one user to a spam mailing list used for marketing; however another user may receive short message services or phone calls, which may not be acceptable.

To protect the personal details of users, aspects that are considered "sensitive" or, attributes of private data that the data owner does not wish to share are generally removed or censored. Any such censorship implies that the remaining data is which the data owner is not averse to sharing. However, such subjective solutions do not guarantee the protection of privacy of data owners as other attributes which are shared in combination with another attribute may reveal the identity of the private data owner uniquely. For example, a data owner may identify his name, address and phone number to be sensitive attributes and censor these attributed while sharing information with third parties. However, the shared data may contain attributes such as date of birth, place of birth and a congenital condition, which may in combination uniquely identify the data owner.

SUMMARY

This summary is provided to introduce concepts related to providing an optimal trade off point between privacy of a private data and utility of a utility application thereof. This summary is not intended to identify essential features of the claimed subject matter nor is it intended for use in determining or limiting the scope of the claimed subject matter.

In one implementation, a computer implemented method for determining a privacy-utility trade off us described. In said implementation, the method includes quantifying privacy content of a private data associated with a user based on uniqueness of information in the private data, where the private content comprises sensitive information about the user. The method further includes determining a privacy-utility trade off point model based on analytical analysis of the privacy content, a privacy requirement of the user, and a utility requirement of third party to which the private data is disclosed, where the privacy-utility trade off point model is indicative of optimal private data sharing technique with the third party. Furthermore, the method also includes identifying privacy settings for the user based on risk appetite of the third party, utilizing the determined privacy-utility tradeoff point model where the risk appetite of the third party is indicative of the third party's utility requirement and private data sharing capabilities.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

Figure 1:
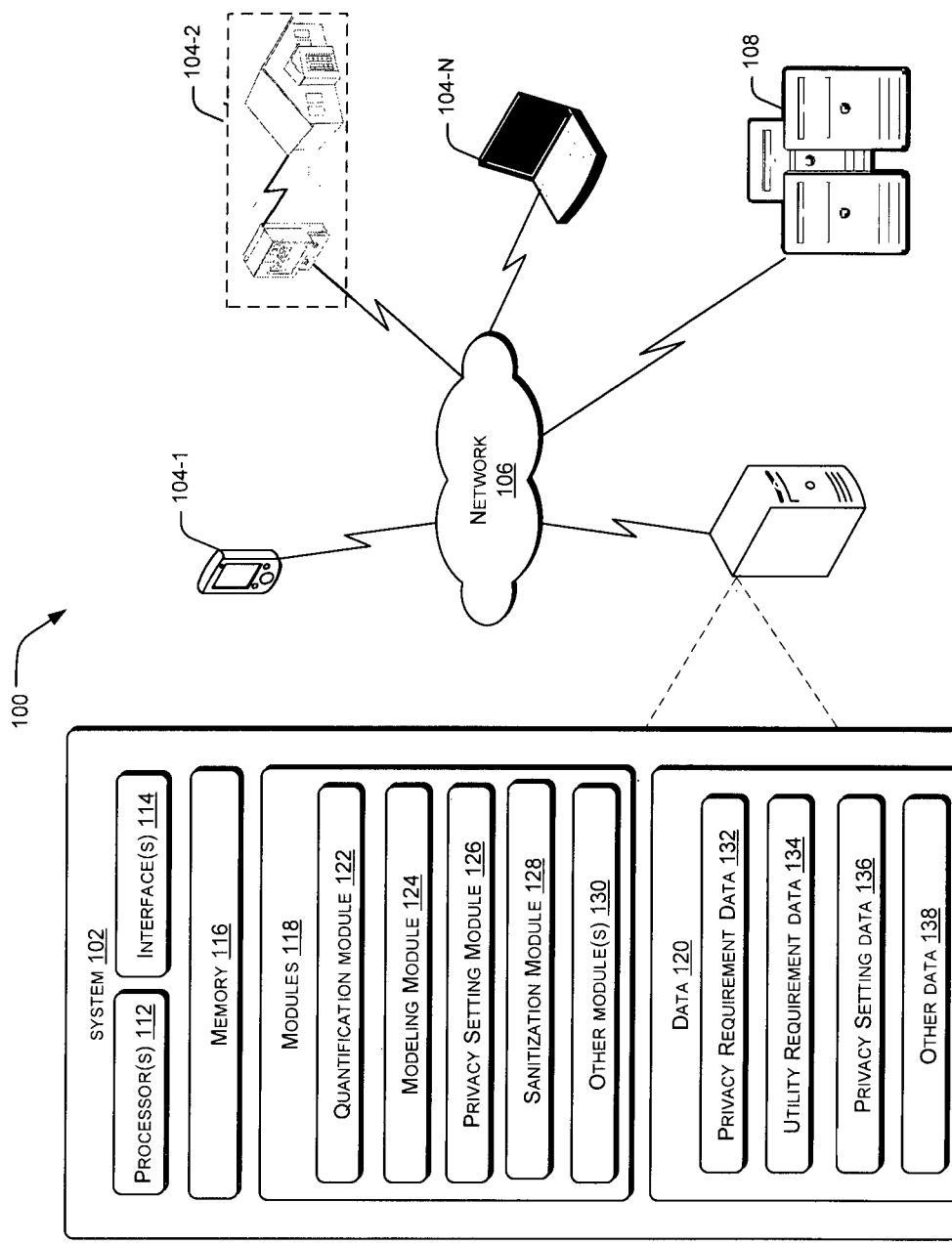
FIG. 1 illustrates an exemplary implementation of a privacy utility trade off tool, implemented in a network, according to an embodiment of the present subject matter.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

DETAILED DESCRIPTION

Systems and methods are described herein for providing an optimal trade off point between privacy of a private data and utility of a utility application thereof. The methods can be implemented in data collection servers, and communication devices communicating sharing private data of users with third parties through various networks. The data collection servers and computing systems that can implement the described methods include, but are not limited to, desktop computers, hand-held devices, laptops or other portable computers, tablet computers, mobile phones, PDAs, Smartphones, and the like. Although the description herein is explained with reference to a communicating device such as a smart device, the described methods may also be implemented in any other devices, as will be understood by those skilled in the art.

More and more information of individuals, companies and other organizations are being gathered and shared on the internet and other platforms. In certain scenarios, the data gathered is used for research purpose, while in other; the data is utilized for marketing and analysis use. The data that is collected can be related to different fields and may include different attributes utilized differently for different purposes. For example, health records and medical data related to users may be collected by medical insurance companies to determine premiums and policy offering for such users. Similarly, the same health records and medical data may also be utilized by healthcare institutes to treat the users in conditions of medical necessity and emergencies. In another scenario, the health records and medical data of such users may be used by drug manufacturing companies for research and development purposes. Therefore, the private data of users can be utilized by different organizations in different ways and for different purposes.

Further, data gathered can be related to different fields. For example, for different users apart from health records and medical data, financial data of the users may also be gathered including monthly salary, account number, minimum balance details and the like. Such financial data may be used by banking institutes to strategize policies and offerings to their customers. Further such financial data may also be utilized by loan providing institutes to identify and reach to potential customers. Hence, the private data of users can be of different fields, such as healthcare, finance, social, and official. Furthermore, there are an increasing number of utility applications and organizations that require such private data, or parts of such data, such as government agencies, private institutions, third party promotional organizations, and the like, that work in area of national security, marketing applications, market survey applications etc.

While the data associated with users is shared with multiple organizations and institutes for various purposes, certain third parties may monitor and collect information pertaining to end users through various means, such as by analyzing data gathered by other organizations or gathering other personally identifiable information shared and published by users themselves.

In certain situations, the data accessed by the third parties can be misused for purposes that may affect the users adversely. For example, based on the attributes of the private data collected from different users, it is possible that different users may be uniquely identified by the third party. This may result in compromising the personal or confidential information of the user and may expose them to potential privacy breaches or make them the target of advertisers or spammers, etc. Further, in extreme cases, the users may even be a victim of various crimes such as identity theft, credit card frauds, etc.

Although, private data of users is shared with other organizations implementing various applications to serve to their utility, protecting privacy of an individual while sharing data has become increasingly more important with increased sharing and mining of data. In order to provide privacy preservation, perturbation of private data can be used. However, an arbitrary perturbation may cause utility loss such that the data does not contain the required information for the efficient analysis and intended use by the applications. In other words, providing arbitrary perturbation or providing perfect privacy by complete perturbation of private data may result in complete utility loss rendering the data useless for applications. Hence, ways of sharing private data to meet the utility of applications while preserving the privacy of the users are the solutions highly sought for.

Conventionally, to achieve a tradeoff between the preservation of privacy with respect to private data and utility of the data for different applications utilized by organizations, subjective analysis is utilized. The subjective analysis involves receiving the attributes of private data required for the utility of the application for which the data is to be utilized. The private data gathered from different users is then analyzed to assess the loss in privacy based on the attributed of private data required for the utility of the application. In case due to sharing of private data, based on the attributes, it is determined that privacy is lost beyond a perceived threshold, then the private data is modified or suppressed, till the tradeoff between the privacy loss and the utility gain is acceptable to the user and the application. Since, this approach requires repetitive modifications, personal intervention of user is required to negotiate a tradeoff with the application.

In the case, when sensitive data needs to be shared for performing some applications or providing some services, user must get aware of the cost of sharing private data to avail such applications and services. The cost is a function of the privacy disclosure incurred due to sharing private data. When the cost of private data sharing is more than the satisfaction of the user, an optimal point of utility function for the application and the service is to be evaluated to trade-off between privacy and utility. The optimal point should not be subjective to application, data type and user, which severely restricts the scope, applicability and the decision making becomes difficult due to the ambiguity of subjective inference. The optimal point is to be very objective and quantifiable in nature which ensures unambiguous decision making.

According to one implementation of the present subject matter, methods for achieving tradeoff between the privacy of private data of users and utility of application is described. The described methods on one hand, allow assessment of privacy associated with the private data of users based on analytical quantification, on the other, also provide a precise and optimal tradeoff point satisfying the privacy requirements of the users and the utility requirements of third party and their applications. For the sake of explanation, third parties and applications utilized by then have been used interchangeably in the description henceforth.

In other words, analytical methods are utilized to unambiguously estimate privacy content of the private data while sharing the private data to third parties. This allows transparent view of loss of privacy of the private data, if any, while being shared with the third parties. Further, estimation of privacy associated with the private data based on the utilization of analytical methods, enables precise quantification of the trade-off point. Further, since the implementation of the described methods disassociates the subjectivity associated with individual users for determination of attributes contributing to the privacy of the private data, it allows computable and measurable estimation of privacy content of the private data and an optimal tradeoff point.

In one implementation of the present subject matter, the private data of users to be shared with third parties for various purposes is analyzed and quantified to estimate the privacy content associated with the private data. For this purpose, the privacy content associated with the private data is measured in terms of uncertainty of identifying information in the attributes of the private data. In other words, the privacy content associated with the private data is dependent on the uniqueness of the information contained in the attributes of the private data. For example, more unique is an information within an attribute of the private data, more is its information content, and consequently, the more information content an attribute of the private data possess, more is its privacy content associated with the private data.

For example, nowadays smart meters are being used in many households to access electricity consumption details for each household. Such smart meter allows fine grained energy consumption data collection which also includes private data associated with different users. The data gathered by the smart meters can be used for purposes beyond estimation of power usage, which is indeed potentially dangerous privacy breach against the users from whom the data is collected. One of the most common applications of smart meter data usage is activity monitoring. Smart meter data carries strong signature of the activity of the owner whose energy consumption is displayed by the smart meter including other private information. However, for enabling "Smart home energy management systems", fine grain energy data from individual smart meter is to be shared with different third parties like smart appliance manufacturers, green environment forums, government/civil administration and other agencies. Such third parties are the consumers of smart meter data utilizing the smart meter data for various purposes.

The owners of smart meter have the option of sharing their private data to the third parties to avail the facilities like: outage detection, mapping and restoration, theft detection, remote control of energy connection and disconnection, anomaly detection, alert system, emergency service, dynamic consumption pricing, real-time pricing, home appliance efficiency management, third party suggestion on energy management, elderly monitoring, participation and contribution to green energy initiative, and others. To avail these facilities, the users have to share one or the other part of private data that is associated with user's privacy.

For example, envision that for enabling smart home energy management systems, micro granular energy data from individual smart meter requires to be shared or demanded by third parties like smart appliance manufacturers. Without sharing the private data of smart meter, it is not possible to enable smart home energy management, but the granularity of this private data is function of the amount of activity monitoring, which is a kind of privacy breach. So, a trade-off between privacy (activity monitoring) and utility (enablement of smart home energy management) is to be made by reducing the granularity that satisfies both the parties. In another example, to offer a location-based service, such as finding the nearest gas station, restaurant, traffic congestion analysis, pot hole detection, and similar applications, certain granular level location data (private data) of an individual is required.

In another implementation of the present subject matter, upon determination and quantification of the privacy content from the private data gathered from an individual user, an optimal privacy-utility tradeoff point model is determined in quantifiable terms which are agnostic of applications. The optimal-utility tradeoff point model may signify private data sharing extents where the privacy requirement of a user and the utility requirement of applications utilizing the private data are optimally satisfied. To this end, privacy requirement from the user along with the utility requirement of the private data from the application or data consumer, who uses the data for some purpose, are accounted for. Hence, in consideration of the privacy requirement of the user and the utility requirement of the applications, the privacy-utility trade off point model is determined based on an analytical model.

In yet another implementation of the present subject matter, privacy settings for a user to share private data to a particular application are determined. In said implementation, the determination of the privacy settings is based on risk appetite of applications for which the private data is to be shared. It would be understood that different applications have different risk appetite where risk appetite of an application is determined based on the implication of the application. For example, applications such as disaster management or other emergency type services are considered to be not sharing the private data of users and therefore, can be shared with private data with least amount of perturbation to maximize utility. Such applications are generally identified to have high risk appetite. Similarly, certain applications such as financial applications are generally categorized as applications with less risk appetite as they frequently share the private data of users for different purposes, thereby making perturbation of private data almost a necessity. Therefore, based on the end application utilizing the private data of the user, private settings are determined.

The privacy settings for a user, in one implementation, are determined using the privacy-utility trade off point model based on the risk appetite of the applications with which the private data is shared. In other words, upon determination of the risk appetite of the application with which the private data is to be shared with, the privacy settings for the user are determined utilizing the privacy-utility trade off point model. For example, for a user sharing his private data with a high risk appetite application, the perturbation required to the private data may be less. Hence, in such a situation, the privacy setting of the user may be more utility biased where the privacy-utility trade off point model is utilized with generous privacy restrictions and providing maximum utility to the application.

In another implementation of the present subject matter, the private data of the user is perturbed based on the determined privacy settings. In said implementation, the private data of the user is implemented with the privacy requirement defined by the privacy setting of the user. Based on the requirement, the perturbed data includes the data which satisfies both, privacy concerns of the user as well as utility requirement of the application, thereby providing an optimal privacy-utility tradeoff.

Hence, the implementation of the described techniques provide a privacy-utility trade off point model in quantifiable terms which is agnostic of applications to which private data is to be shared thereby, making the method independent of the applications or data types. Further, the described techniques utilize analytical analysis to determine the privacy content of the private data that eliminated the subjectivity associated with the privacy. This allows providing true and optimal privacy-utility tradeoff to users even while sharing information with applications with variable risk appetite.

The described methodologies can be implemented in hardware, firmware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, electronic devices, other electronic units designed to perform the functions described herein, or a combination thereof. Herein, the term "system" encompasses logic implemented by software, hardware, firmware, or a combination thereof.

For a firmware, and/or software implementation, the methodologies can be implemented with modules (e.g., procedures, functions, and so on) that perform the functions described herein. Any machine readable medium tangibly embodying instructions can be used in implementing the methodologies described herein. For example, software codes and programs can be stored in a memory and executed by a processing unit. Memory can be implemented within the processing unit or may be external to the processing unit. As used herein the term "memory" refers to any type of long term, short term, volatile, nonvolatile, or other storage devices and is not to be limited to any particular type of memory or number of memories, or type of media upon which memory is stored.

In another firmware and/or software implementation, the functions may be stored as one or more instructions or code on a non-transitory computer-readable medium. Examples include computer-readable media encoded with a data structure and computer-readable media encoded with a computer program. Computer-readable media may take the form of an article of manufacturer. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

It should be noted that the description merely illustrates the principles of the present subject matter. It will thus be appreciated that those skilled in the art will be able to devise various arrangements that, although not explicitly described herein, embody the principles of the present subject matter and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Figure 2:
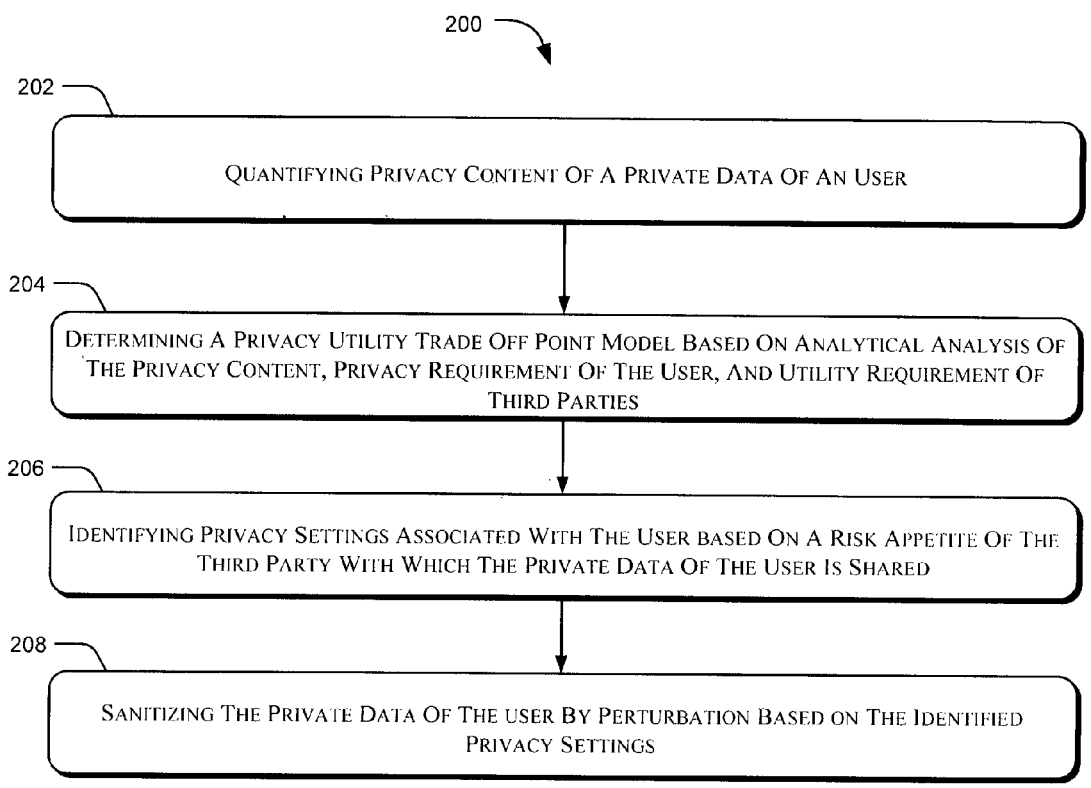
FIG. 2 illustrates a method of identifying a tradeoff point between privacy of private data and utility of third parties, in accordance with an embodiment of the present subject matter.

The manner in which the systems and methods shall be implemented has been explained in details with respect to the FIGS. 1 and 2. While aspects of described systems and methods can be implemented in any number of different computing systems, transmission environments, and/or configurations, the embodiments are described in the context of the following exemplary system(s).

It will also be appreciated by those skilled in the art that the words during, while, and when as used herein are not exact terms that mean an action takes place instantly upon an initiating action but that there may be some small but reasonable delay, such as a propagation delay, between the initial action and the reaction that is initiated by the initial action. Additionally, the word "connected" and "coupled" is used throughout for clarity of the description and can include either a direct connection or an indirect connection.

FIG. 1 illustrates a communication network 100 implementation, describing a trade off system 102 for providing an optimal trade off point between privacy of a private data and utility of applications thereof, in accordance with an embodiment of the present subject matter. For the sake of simplicity, the privacy-utility trade off system 102 is referred to system 102 hereinafter. Further, the system 102 may also be understood as a privacy analyzer providing an optimal trade off point between privacy of a private data and utility of applications thereof. The system 102 described herein, can be implemented in any network environment comprising a variety of network devices, including routers, bridges, servers, computing devices, storage devices, etc. In one implementation the system 102 is connected to one or more user equipments 104-1, 104-2, 104-3, . . . , 104-N, individually and commonly referred to as user equipment(s) 104 hereinafter, through a communication network 106. The user equipments 104 may provide the private data associated with the users to the system 102 through the network 106 for the purpose of analytical analysis and computation of a privacy-utility trade off. In said implementation, the system 102 may also be connected to a third party 108 capable of utilizing multiple applications. Such applications may utilize private data of users for different purposes, like market research, product development, statistical analysis, etc.

The system 102 can be implemented as a variety of communication devices. The, computing systems that can implement the described method(s) include, but are not limited to, mail server, central directory servers, database server, file server, print server, web server, application server, laptop computer, desktop computer, notebook, workstation, mainframe computer, and the like. The system 102 described herein, can also be implemented in any network environment comprising a variety of network devices, including routers, bridges, servers, computing devices, storage devices, etc.

The user equipments 104 providing private data of users may be equipments, but are not limited to, desktop computers, hand-held devices, laptops or other portable computers, tablet computers, mobile phones, PDAs, Smartphones, S mart energy meters, Smart home monitoring systems, smart electric appliances, and the like. Further, the user equipments 104 may include devices capable of exchanging data to provide connectivity to different communicating devices and computing systems. Such devices may include, but are not limited to, data cards, mobile adapters, wireless (WiFi™) adapters, routers, a wireless modem, a wireless communication device, a cordless phone, a wireless local loop (WLL) station, and the like. As user equipments 104 may be stationary or mobile and may also be understood to be a mobile station, a terminal, an access terminal, a subscriber unit, a station, etc.

The network 106 may be a wireless or a wired network, or a combination thereof. The network 106 can be a collection of individual networks, interconnected with each other and functioning as a single large network (e.g., the internet or an intranet). Examples of such individual networks include, but are not limited to, Global System for Mobile Communication (GSM) network, Universal Mobile Telecommunications System (UMTS) network, Personal Communications Service (PCS) network, Time Division Multiple Access (TDMA) network, Code Division Multiple Access (CDMA) network, Next Generation Network (NGN), Public Switched Telephone Network (PSTN), and Integrated Services Digital Network (ISDN). Depending on the technology, the network 106 includes various network entities, such as gateways, routers; however, such details have been omitted for ease of understanding.

According to an implementation of the present subject matter, each of the user equipments 104 may be connected to one system 102. However, in another implementation, each of the user equipment 104 may include an individual system 102 capable of determining privacy-utility trade off prior to providing private data of the user to third parties, such as the third party 108. It will be appreciated, that the user equipments 104 may include applications functioning as functional modules running on the user equipments to gather private data associated with the users.

In one implementation, the system 102 includes processor(s) 112. The processor 112 may be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory.

The functions of the various elements shown in the figure, including any functional blocks labeled as "processor(s)", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), non-volatile storage. Other hardware, conventional and/or custom, may also be included.

Also, the system 102 includes interface(s) 114. The interfaces 114 may include a variety of software and hardware interfaces that allow the system 102 to interact with the entities of the network 106, or with each other. The interfaces 114 may facilitate multiple communications within a wide variety of networks and protocol types, including wire networks, for example, LAN, cable, etc., and wireless networks, for example, WLAN, cellular, satellite-based network, etc.

The system 102 may also include a memory 116. The memory 116 may be coupled to the processor 112. The memory 116 can include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Further, the system 102 may include module(s) 118 and data 120. The modules 118, amongst other things, include routines, programs, objects, components, data structures, etc., which perform particular tasks or implement particular abstract data types. The modules 118 may also be implemented as, signal processor(s), state machine(s), logic circuitries, and/or any other device or component that manipulate signals based on operational instructions.

Further, the modules 118 can be implemented in hardware, instructions executed by a processing unit, or by a combination thereof. The processing unit can comprise a computer, a processor, a state machine, a logic array or any other suitable devices capable of processing instructions. The processing unit can be a general-purpose processor which executes instructions to cause the general-purpose processor to perform the required tasks or, the processing unit can be dedicated to perform the required functions.

In another aspect of the present subject matter, the modules 118 may be machine-readable instructions (software) which, when executed by a processor/processing unit, perform any of the described functionalities. The machine-readable instructions may be stored on an electronic memory device, hard disk, optical disk or other machine-readable storage medium or non-transitory medium. In one implementation, the machine-readable instructions can be also be downloaded to the storage medium via a network connection.

In an implementation, the module(s) 118 includes a quantification module 122, modeling module 124, privacy setting module 126, sanitization module 128, and other module(s) 130. The other module(s) 130 may include programs or coded instructions that supplement applications or functions performed by the system 102. In said implementation, the data 120 includes a privacy requirement data 132, utility requirement data 134, Privacy setting data 136, and other data 138. The other data 138, amongst other things, may serve as a repository for storing data that is processed, received, or generated as a result of the execution of one or more modules in the module(s) 118. Although the data 120 is shown internal to the system 102, it may be understood that the data 120 can reside in an external repository (not shown in the figure), which may be coupled to the system 102. The system 102 may communicate with the external repository through the interface(s) 114 to obtain information from the data 120.

As described before, the system 102 is configured to provide an optimal trade off point between privacy of a private data and utility of applications. In other words, when a user U with private data D intends to share the private data to a third party, such as the third part 108, there is a risk of sharing privacy content included in the private data D that may affect the user U adversely. Due to this, the user U may utilize the system 102 to determine the privacy content in the private data D while being shared with the third party 108. The system 102 is configured to assess the privacy risk of sharing the private data D with the third party 108. Effectively, the system, 102 computes an optimal privacy-utility trade off point based on privacy requirement of the user U, and the utility requirement of the third party 108.

To avoid any situation of deadlock between the user U and the third party 108, it is considered that both, the user U and the third party 108 are cooperative where none of the two are greedy or hostile. It is also assumed that by sharing the private data, the user U gets some benefit in terms of incentive and, the third party likes to avert the risk of the misuse of user's private data. In such a situation, the system 102 perturbs the private data D to create another private data D' based on the optimal privacy-utility trade-off point, to be shared with the third part 108.

To this end, in one implementation, the quantification module 122, of the system 102, is configured to privacy content of the private data gathered from the user equipments 104. The quantification module 122 measures the privacy content of the private data in terms of uncertainty of identifying the elements of that private data set. That is, more unique a data element is, more is its information content and the more information content a data element possess, more is its privacy content. The quantification module 122, determines the privacy content of the private data based on a heuristic approach where, when some data elements form indistinguishable group in a fixed and finite private data set, then its information content diminishes, hence its privacy content also decreases. For example, if ρ is a set of P number of distinct private data elements, i.e. $\rho=\{\rho_1, \rho_2, \ldots, \rho_p\}$, $|\rho|=P$ and $p_i$=probability of occurrence of $i^{th}$ data, the quantification module 122 computes the privacy content of ρ as:

Given $\rho_i$, $i \forall P$, a privacy gain of ρ is its entropy with respect to the distribution of $\rho_i$ measuring the information theoretic randomness of $\rho_i$, where freq($\rho_i$) is the frequency of occurrence of $\rho_i$.

$$\text{Privacy content} = \eta = -\sum_{i=1}^{i=|\rho|} \frac{freq(\rho_i)}{|\rho|} \log_2 \frac{freq(\rho_i)}{|\rho|} \quad \text{Equation (1)}$$

Based on the above described equation, the privacy content η is measured by the quantification module 122.

In another implementation of the present subject matter, when in certain type of the private data, apriori knowledge of a standard (reference) or equivalent non private data set ϱ is available, Kullback-Leibler (KL) divergence may be utilized by the quantification module 122 to identify the relative entropy between the standard and the existing data set, which needs to be shared. In such situations, the privacy content of the private data ρ may be measured as:

$$\eta = KL(\rho \| \varrho) = \sum_{i=1}^{i=|\rho|} \frac{freq(p_i)}{|\rho|} \log_2 \left( \frac{freq(p_i)}{freq(\varrho_i)} \right) \quad \text{Equation (2)}$$

Measurement of relative entropy by KL divergence, provides a measure of discrepancy between the standard and existing data. Hence, more the KL divergence between the reference and the existing private data set, more is the privacy revealed. Therefore, based on the above described techniques, the quantification module 122 may quantify the privacy content associated with the private data of users.

In another implementation of the present subject matter, the modeling module 124 is configured to determine a privacy-utility trade off point model that can compute privacy settings for a user or different applications and various users. In other words, a privacy-utility trade off point model is determined which is agnostic of the applications and can determine a quantifiable privacy-utility trade off point for a given user, and a given application. In one implementation, the modeling module 124 considers a privacy requirement ($\mu_p$) from an individual user, a utility requirement ($\mu_u$) from the third party utilizing the private data of the individual user, and the privacy content (η) associated with the private data of the individual user for determination of the privacy-utility trade off point model. The privacy requirement ($\lambda_p$) from an individual user and the utility requirement ($\mu_u$) from the third party may be stored in the privacy requirement data 132 and the utility requirement data 134 of the system 102 respectively.

As described before, to protect the privacy content of the private data from being shared with the third parties, the third parties are provided with a lossy, irreversibly transformed private data ρ'. The transformed private data ρ' is generalization on the original private data such that it contains lesser granular private data. For this purpose, the modeling module 124 defines the optimal sharing point ($\delta_{opt}$) as a difference between the privacy content of the private data ρ and that of transformed private data ρ', such that $$\delta_{opt} = \eta - \eta' \text{ and } \delta_{opt} \geq 0$$

It would be understood that when $\delta_{opt}=0$ there is no privacy protection of the private data, and when $\delta_{opt}=\eta$, there is absolute privacy protection of the private data. Therefore, the privacy-utility trade off point model defines the optimal sharing point $\delta_{opt}$ as a function of the private data, the privacy requirement, and the utility requirement, such that $\delta_{opt}=f(\rho, \mu_p, \mu_u)$.

To effectively determine the dependencies of the optimal sharing point $\delta_{opt}$, different scenarios of private data sharing are considered. For example, one scenario is where privacy is of more importance than the utility of the application utilizing the data. Similarly, another scenario is where the utility of the application is of importance and the risk of sharing the private data is minimal. Based on the assessment of the above mentioned scenarios, the functional dependency of the optimal sharing point is determined as follows:

$$\delta_{opt} = \eta \cdot \left\{ 1 - \left\{ \begin{array}{ll} \left\{ \begin{array}{l} \mu_u(1-\mu_p)\mu_u \geq 0.5, \\ \mu_p \leq 0.5 \\ \mu_p(1-\mu_u)\mu_u \leq 0.5, \\ \mu_p \geq 0.5 \end{array} \right\} & \text{for utility biased case} \\ \left\{ \begin{array}{l} \mu_p(1-\mu_u)\mu_u \geq 0.5, \\ \mu_p \leq 0.5 \\ \mu_u(1-\mu_p)\mu_u \leq 0.5, \\ \mu_p \geq 0.5 \end{array} \right\} & \text{for privacy biased case} \\ \{(1-\mu_p)(1-\mu_u)\} & \text{otherwise} \end{array} \right\} \right\} \quad \text{Equation (3)}$$

In another implementation of the present subject matter, the modeling module 124 utilizes an analytical model to determine the dependency of the optimal sharing point $\delta_{opt}$, with the privacy requirement, utility requirement, and the private data.

The computation of $\delta_{opt}$ as described in equation 2, at times does not satisfy the practical perception that utility function is concave in nature, i.e. marginal utility or privacy decreases with increasing value of $\mu_p$ and $\mu_u$. Therefore, for the situations where the risk of privacy breach and benefit of utility are very competitive in nature and the stake is very high, risk aversion concept of marginal utility is utilized. To utilize the concave nature of utility, the modeling module 124 defined the optimal sharing point $\delta_{opt}$ as:

$$\delta_{opt} = \begin{cases} \dfrac{\omega\kappa}{1-\kappa(\mu_u-1)}, & \mu_p \neq \mu_u \\ \dfrac{\omega}{1-\mu_u}, & \mu_p = \mu_u \end{cases} \quad \text{Equation (4)}$$

where, $$\kappa = \begin{cases} \dfrac{e^{\frac{ln\gamma}{\alpha-2}}-1}{\mu_{p-u}}, & \mu_p \neq \mu_u \\ \delta_{opt} = \dfrac{\omega}{1-\mu_u}, & \mu_p = \mu_u \end{cases}$$

$$\text{and } \omega = \sum_{i=1}^{P} p_i \log\left(\dfrac{1}{p_i}\right)$$

In the above described equation 4, $\omega$ is the absolute utility when the private data $\rho$ is published without any perturbation. When the utility of $\omega$ is provided, the privacy protection is nil as the private data is published or shared without any sanitization.

Based on the above described equation 4, the modeling module 124 determines the privacy-utility trade off point model where the private data is to be hidden by the amount $\delta_{opt}$ from its information theoretic entropy value to reach the optimal point to satisfy the privacy requirement of the individual user and the utility requirement of the third party 108.

In another implementation of the present subject matter, based on the privacy-utility trade off point model, privacy settings of a user for sharing the private data with a third party are determined. For this purpose, the privacy setting module 126 of the system 102 is configured to determine privacy setting of a user based on the risk appetite of the third party 108 or applications to which the private data of the user is to be shared. As described earlier, different applications have different risk appetite where risk appetite of an application is determined based on the implication of the application. For example, applications such as disaster management or other emergency type services are considered to be not sharing the private data of users and therefore, can be shared with private data with least amount of perturbation to maximize utility. Such applications are generally identified to have high risk appetite. Similarly, certain applications such as financial applications are generally categorized as applications with less risk appetite as they frequently share the private data of users for different purposes, thereby making perturbation of private data almost a necessity. Therefore, based on the end application utilizing the private data of the user, the privacy setting module 126 is configured to determine the private settings of a user.

In one implementation, the privacy setting module defines the privacy requirement of the individual user and the utility requirement of the applications based on the risk appetite of the applications. In other words, if risk appetite of the application is high, the privacy setting module 126 may define a near maximum ($\mu_u$) and a near minimum ($\mu_p$). Similarly, if risk appetite is low, the privacy setting module 126 may define a near minimum ($\mu_u$) a near maximum ($\mu_p$). Hence, upon determination of the risk appetite of the application, the values of $\mu_p$ and $\mu_u$ are determined.

Upon determination of the values of the privacy requirement and the utility requirement, the privacy setting module 126 may further determine the optimal privacy-utility trade off point or, the optimal sharing point $\delta_{opt}$. In one implementation, the privacy setting module 126 may determine the optimal privacy-utility tradeoff point utilizing the privacy-utility trade off point model, and based on the determined values of the privacy requirement and the utility requirement. The privacy setting $\phi$ may be defined as $\phi = \delta_{opt}$, where $\delta_{opt}$ is based on $\mu_p$ and $\mu_u$ and stored at the privacy settings data 136.

In yet another implementation of the present subject matter, the private data of user may be perturbed based on the determined privacy settings, to be shared with the application/third party 108. The perturbed data is the transformed private data p' which is generalization on the original private data such that it contains lesser granular private data. The sanitization module 128 of the system 102 is configured to perturb the private data $\rho$ of the user based on the determined privacy settings. The sanitization module 128 may find the range of data types as $\Psi$. Based on the range of data type, the sanitization module 128 may compute a transformed range of data as $\Psi'$ of the entire private data $\rho$ such that:

$$\Psi \approx \Delta \cdot \Psi' \quad \text{Equation (5)}$$

where $\Psi'$ is the range of each subset and $\Delta$ is the block-size of the private data $\rho$.

Thereafter, upon computation of the transformed range of data types, the sanitization module 128 may form a transformed private data $\rho'$ by mapping the private element of the private data into the appropriate sub range blocks. For example, for a private data represented in the table shown below:

TABLE 1

| Sl. no. | Value |
|---|---|
| 1 | 105 |
| 2 | 190 |
| 3 | 69 |
| 4 | 121 |
| 5 | 23 |
| 6 | 156 |
| 7 | 79 |
| 8 | 121 |
| 9 | 89 |
| 10 | 141 | the range of data types is $\Psi = 190 - 23 = 167$. For the above mentioned private data, the privacy content derived based on equation 1 would be $\eta = \log 2(10) = 3.32$. Further, if the optimal sharing point or the privacy-utility trade off point determined for this private data based on the application for which the data is to be shared is $\phi = 1.5$, the sanitization module 128 may form the transformed private data $\rho'$ represented as:

TABLE 2

| Sl. no. | Value |
|---|---|
| 1 | 100-149 |
| 2 | 150-199 |
| 3 | 50-99 |
| 4 | 100-149 |
| 5 | 0-49 |
| 6 | 150-199 |
| 7 | 50-99 |
| 8 | 100-149 |
| 9 | 50-99 |
| 10 | 100-149 | where $\Delta=4$ and $\Psi'=50$

Furthermore, the sanitization module 128 may also compute the privacy content for the transformed private data $\rho'$ to determine if the privacy setting of the user is satisfied. In the above described scenario, the privacy content of the transformed private data $\rho'$ would be: $\eta'=4/10 \log(10/4)+1/5 \log(5/1)+3/10 \log(10/3)+1/10 \log(10/1)=1.85$. Since the privacy content of the original private data was computed to be 3.32, the deviation in the privacy content would be $\delta=3.32-1.85=1.47\approx\phi(1.5)$.

Hence, the transformed private data of the user can be provided to the applications.

The described techniques for the present subject matter provide an optimal trade off point between privacy of a private data and utility of a utility application thereof. The described techniques also provide privacy improvement of about 55% when private data is shared using the described analytical technique of privacy preservation thereby, providing privacy to the private content of the users.

FIG. 2 illustrates a method 200 for obtaining a privacy-utility trade off point model and generating a perturbed private data set optimal for sharing without loss of privacy to the users is described, according to an embodiment of the present subject matter. The order in which the method 200 is described is not intended to be construed as a limitation, and any number of the described method blocks can be combined in any order to implement the method 200, or any alternative methods. Additionally, individual blocks may be deleted from the method without departing from the spirit and scope of the subject matter described herein. Furthermore, the method can be implemented in any suitable hardware, software, firmware, or combination thereof.

The method may be described in the general context of computer executable instructions. Generally, computer executable instructions can include routines, programs, objects, components, data structures, procedures, modules, functions, etc., that perform particular functions or implement particular abstract data types. The method may also be practiced in a distributed computing environment where functions are performed by remote processing devices that are linked through a communications network. In a distributed computing environment, computer executable instructions may be located in both local and remote computer storage media, including memory storage devices.

A person skilled in the art will readily recognize that steps of the method can be performed by programmed computers. Herein, some embodiments are also intended to cover program storage devices, for example, digital data storage media, which are machine or computer readable and encode machine-executable or computer-executable programs of instructions, where said instructions perform some or all of the steps of the described method. The program storage devices may be, for example, digital memories, magnetic storage media such as a magnetic disks and magnetic tapes, hard drives, or optically readable digital data storage media. The embodiments are also intended to cover both communication network and communication devices configured to perform said steps of the exemplary method.

Referring to FIG. 2, at block 202, private content of a private data is quantized. The private data associated with each user may include privacy content that may be sensitive to the users. In one implementation of the present subject matter, such privacy content is determined in terms of uncertainty of identifying the elements of that private data. That is, more unique a data element is, more is its information content and the more information content a data element possess, more is its privacy content. In another implementation, the system 102 may be utilized for the quantification where the quantification module 122 may determine the privacy content of the private data based on a heuristic approach. It may be considered that when some data elements form indistinguishable group in a fixed and finite private data set, then its information content diminishes, hence its privacy content also decreases. In said implementation, equation 1 or equation 2 may be utilized for the quantification. The equations are re-iterated as below:

$$\text{Privacy content} = \eta = -\sum_{i=1}^{i=|\rho|} \frac{freq(\rho_i)}{|\rho|} \log_2 \frac{freq(\rho_i)}{|\rho|} \quad \text{Equation (1)}$$

$$\text{Privacy content} = \quad \text{Equation (2)}$$
$$\eta = KL(\rho \| \varrho) = \sum_{i=1}^{i=|\rho|} \frac{freq(p_i)}{|\rho|} \log_2 \left( \frac{freq(p_i)}{freq(\varrho_i)} \right)$$

At block 204, a privacy utility trade off point model is determined based on analytical analysis of privacy requirement of users and utility requirement of third parties. In one implementation the modeling module 124 of the system 102 may determine the privacy utility trade off point model based on analytical analysis privacy requirement of users and utility requirement of third parties. The determined privacy utility trade off point models agnostic of the application to which the private data of the users may be shared with. Further, the privacy utility trade off point model may provide a framework for determination of an optimal sharing point where the privacy of the user is not lost and the utility of the third party is also achieved.

At block 206, privacy settings associated with the user are identified based on a risk appetite of the third party with which the private data of the user is shared. Different third parties may have different risk appetite depending upon the reliability and utility of the third parties. Therefore, for third parties with high risk appetite, utility biased privacy settings may be determined and for third parties with low risk appetite, privacy biased privacy settings may be determined. In one implementation, the privacy settings may be determined based on the privacy requirement and the utility requirement associated with the risk appetite of the third party.

At block 208, the private data of the user is sanitized by perturbation based on the identified privacy settings. A transformed private data is obtained based on the privacy settings of the user to protect the privacy content of the private data from being shared with the third party. In one implementation, the perturbation of the private data may be based on the privacy-utility trade off point model where the optimal sharing point may allow protection of the privacy content of the private data.

Although the subject matter has been described with reference to specific embodiments, this description is not meant to be construed in a limiting sense. Various modifications of the disclosed embodiments, as well as alternate embodiments of the subject matter, will become apparent to persons skilled in the art upon reference to the description of the subject matter. It is therefore contemplated that such modifications can be made without departing from the spirit or scope of the present subject matter as defined.

I claim:

1. A computer implemented method for determining a privacy-utility trade off, the method comprising:
quantifying privacy content of a private data associated with a user based on uniqueness of information in the private data, wherein the quantifying comprises determining a theoretic randomness and uncertainty of information in the private data of the user, and wherein the private content comprises sensitive information about the user;
determining a privacy-utility trade off point model based on analytical analysis of the privacy content of a private data associated with a user, a privacy requirement of the user, and a utility requirement of third party utilizing the private data of the user, wherein the privacy-utility trade off point model is indicative of optimal private data sharing technique with the third party for determining optimal sharing point, and wherein the optimal sharing point is a difference between the privacy content of the private data and that of a transformed private data;
identifying privacy settings for the user based on risk appetite of the user, utilizing the determined privacy-utility tradeoff point model, wherein the risk appetite of the user is indicative of the user's utility requirement and private data sharing capabilities; and
sanitizing the private data of the user by perturbation based on the identified privacy settings for the user wherein the perturbation reduces a granularity of the private data, and wherein the sanitization further comprises:
ascertaining the privacy requirement of the user, and the utility requirement of third party based on the privacy setting of the user; and
determining the optimal sharing point based on the privacy-utility trade off point model and the ascertained privacy requirement of the user,
wherein the quantifying further comprises computing Kullback-Leibler divergence to determine relative entropy between the private data of the user and a standard non-private data, wherein the divergence is indicative of the privacy content of the private data.

2. A system for determining a privacy-utility trade off, the system comprising:
a processor;
a quantification module coupled to the processor, wherein the quantification module is configured to quantify privacy content of a private data associated with a user based on uniqueness of information in the private data, wherein the quantifying further comprises determining a theoretic randomness and uncertainty of information in the private data of the user, and wherein the private content comprises sensitive information about the user;
a modeling module coupled to the processor, wherein the modeling module is configured to determine a privacy-utility trade off point model based on analytical analysis of the privacy content of a private data associated with a user, a privacy requirement of the user, and a utility requirement of third party utilizing the private data of the user, wherein the privacy-utility trade off point model is indicative of optimal private data sharing technique with the third party for determining optimal sharing point, and wherein the optimal sharing point is a difference between the privacy content of the private data and that of a transformed private data;
a privacy setting module coupled to the processor, wherein the privacy setting module is configured to identify privacy settings for the user based on risk appetite of the user, utilizing the determined privacy-utility tradeoff point model, wherein the risk appetite of the user is indicative of the user's utility requirement and private data sharing capabilities; and
a sanitization module coupled to the processor, wherein the sanitization module is configured to sanitize the private data of the user by perturbation based on the identified privacy settings for the user wherein the perturbation reduces a granularity of the private data, and wherein to sanitize the private data of the user, the sanitization module is configured to:
ascertain the privacy requirement of the user, and the utility requirement of third party based on the privacy setting of the user; and
determine the optimal sharing point based on the privacy-utility trade off point model and the ascertained privacy requirement of the user;
wherein the quantification module is further configured to compute Kullback-Leibler divergence to determine relative entropy between the private data of the user and a standard non-private data, wherein the divergence is indicative of the privacy content of the private data.

3. A non-transitory computer-readable medium having embodied thereon a computer readable program code for executing a method comprising:
quantifying privacy content of a private data associated with a user based on uniqueness of information in the private data, wherein the quantifying comprises determining a theoretic randomness and uncertainty of information in the private data of the user, and wherein the private content comprises sensitive information about the user, and further comprises computing a Kullback-Leibler divergence to determine relative entropy between the private data of the user and a standard non-private data, wherein the divergence is indicative of the privacy content of the private data;
determining a privacy-utility trade off point model based on analytical analysis of the privacy content of a private data associated with a user, a privacy requirement of the user, and a utility requirement of third party utilizing the private data of the user, wherein the privacy-utility trade off point model is indicative of optimal private data sharing technique with the third party for determining optimal sharing point, and wherein the optimal sharing point is a difference between the privacy content of the private data and that of a transformed private data;
identifying privacy settings for the user based on risk appetite of the user, utilizing the determined privacy-utility tradeoff point model, wherein the risk appetite of the user is indicative of the user's utility requirement and private data sharing capabilities; and
sanitizing the private data of the user by perturbation based on the identified privacy settings for the user wherein the perturbation reduces a granularity of the private data, and wherein the sanitization further comprises:
ascertaining the privacy requirement of the user, and the utility requirement of third party based on the privacy setting of the user; and
determining the optimal sharing point based on the privacy-utility trade off point model and the ascertained privacy requirement of the user.

* * * * *